US010068429B2

(12) United States Patent
Gagner et al.

(10) Patent No.: US 10,068,429 B2
(45) **Date of Patent: *Sep. 4, 2018**

(54) TRANSFERRING AWARDS VIA OPTICAL MACHINE READABLE DATA REPRESENTATION IMAGES

(71) Applicant: Bally Gaming, Inc., Las Vegas, NV (US)

(72) Inventors: Mark B Gagner, West Chicago, IL (US); Damon E Gura, Chicago, IL (US); Timothy C Loose, Chicago, IL (US); James M Rasmussen, Chicago, IL (US); Victor T Shi, Morton Grove, IL (US); Alfred Thomas, Las Vegas, NV (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,573

(22) Filed: Jan. 6, 2017

(65) Prior Publication Data

US 2017/0116822 A1 Apr. 27, 2017

Related U.S. Application Data

(63) Continuation of application No. 14/981,531, filed on Dec. 28, 2015, now Pat. No. 9,640,033, which is a (Continued)

(51) Int. Cl.
*A63F 13/00* (2014.01)
*G07F 17/32* (2006.01)

(52) U.S. Cl.
CPC ...... *G07F 17/3255* (2013.01); *G07F 17/3225* (2013.01)

(58) Field of Classification Search
USPC .............. 463/40-42, 16-25; 273/292, 138 R
See application file for complete search history.

(56) References Cited

U.S. PATENT DOCUMENTS 5,265,874 A 11/1993 Dickinson et al.
5,290,033 A 3/1994 Bittner et al.
(Continued)

FOREIGN PATENT DOCUMENTS

EP 1622104 2/2006
EP 1630754 3/2006
(Continued)

OTHER PUBLICATIONS

"AU Application No. 2009314212 Examination Report", Apr. 18, 2013, 2 pages.
(Continued)

*Primary Examiner* — Masud Ahmed
(74) *Attorney, Agent, or Firm* — DeLizio Law, PLLC

(57) ABSTRACT

Club cards and tickets can be eliminated by providing an application that allows a player's mobile phone to process an image of an optical machine-readable representation of data. At the end of a wagering session on a WGM, the WGM can display a barcode representing a player's winnings, an achievement, game status, etc. The player takes a picture of the barcode with his or her mobile phone. The application on the phone processes the barcode image and automatically updates an account of the player in accordance with the data represented or carried by the barcode. For instance, the mobile phone sends a request to a wagering account server to electronically deposit the winnings, as represented by the barcode, in a wagering account associated with the player's club profile.

20 Claims, 12 Drawing Sheets

Related U.S. Application Data continuation of application No. 14/564,005, filed on Dec. 8, 2014, now Pat. No. 9,224,263, which is a continuation of application No. 13/804,603, filed on Mar. 14, 2013, now Pat. No. 8,932,140, which is a continuation of application No. 13/127,584, filed as application No. PCT/US2009/064003 on Nov. 11, 2009, now Pat. No. 8,419,548.

(60) Provisional application No. 61/113,876, filed on Nov. 12, 2008.

(56) References Cited

U.S. PATENT DOCUMENTS

| | | | | |
|---|---|---|---|---|
| 5,429,079 | A | 7/1995 | Murata et al. | |
| 5,470,079 | A | 11/1995 | Lestrange et al. | |
| 5,674,128 | A | 10/1997 | Holch et al. | |
| 6,048,269 | A | 4/2000 | Burns et al. | |
| 6,905,411 | B2 | 6/2005 | Nguyen et al. | |
| 7,431,297 | B2 * | 10/2008 | Kaji | A63F 1/02 273/236 |
| 8,333,655 | B2 | 12/2012 | Gagner et al. | |
| 2003/0032474 | A1 | 2/2003 | Kaminkow | |
| 2003/0065805 | A1 | 4/2003 | Barnes, Jr. | |
| 2005/0239546 | A1 * | 10/2005 | Hedrick | G07F 17/0014 463/29 |
| 2006/0040741 | A1 * | 2/2006 | Griswold | G07F 17/32 463/40 |
| 2006/0068917 | A1 * | 3/2006 | Snoddy | A63F 13/27 463/42 |
| 2006/0095290 | A1 * | 5/2006 | Chernev | G06F 21/31 705/44 |
| 2007/0060302 | A1 * | 3/2007 | Fabbri | G07F 17/323 463/24 |
| 2007/0238505 | A1 | 10/2007 | Okada | |
| 2008/0090654 | A1 * | 4/2008 | Okada | G07F 17/32 463/29 |
| 2008/0268934 | A1 * | 10/2008 | Mattice | G07F 17/32 463/16 |
| 2009/0011821 | A1 * | 1/2009 | Griswold | G07F 17/32 463/25 |
| 2010/0120525 | A1 * | 5/2010 | Baerlocher | G07F 17/32 463/29 |
| 2010/0222141 | A1 * | 9/2010 | Lasalvia | G07F 17/3223 463/29 |
| 2010/0227691 | A1 * | 9/2010 | Karsten | G07F 17/32 463/42 |
| 2016/0225223 | A1 | 8/2016 | Lemay et al. | |

FOREIGN PATENT DOCUMENTS

| | | |
|---|---|---|
| JP | 2007075612 | 3/2007 |
| JP | 2007158573 | 6/2007 |
| WO | 2007078533 | 7/2007 |
| WO | 2008005300 | 1/2008 |
| WO | 2008005302 | 1/2008 |
| WO | 2010017252 | 2/2010 |

OTHER PUBLICATIONS

"PCT Application No. PCT/US09/64003 International Preliminary Report on Patentability", Mar. 21, 2011, 13 pages.

"PCT Application No. PCT/US09/64003 International Search Report", Mar. 5, 2010, 11 pages.

"UK Application No. 1109809.2 Examination Report", Oct. 21, 2014, 7 pages.

"UK Application No. 1109809.2 Examiner's Answer", Jun. 29, 2015, 6 pages.

"U.S. Appl. No. 13/127,584 Office Action", dated May 7, 2012, 22 pages.

"U.S. Appl. No. 13/804,603 Final Office Action", dated Jun. 11, 2014, 7 Pages.

"U.S. Appl. No. 13/804,603 Office Action", dated Jan. 14, 2014, 6 Pages.

"U.S. Appl. No. 14/564,005 Office Action", dated Mar. 19, 2015, 5 Pages.

"U.S. Appl. No. 14/981,531 Office Action", dated Apr. 1, 2016, 9 pages.

"U.S. Appl. No. 14/981,531 Office Action", dated Jun. 15, 2016, 6 pages.

"U.S. Appl. No. 15/683,468 Office Action", dated Dec. 18, 2018, 13 pages.

* cited by examiner

TRANSFERRING AWARDS VIA OPTICAL MACHINE READABLE DATA REPRESENTATION IMAGES

RELATED APPLICATIONS

This application is a continuation of and claims priority benefit of U.S. application Ser. No. 14/981,531 filed Dec. 28, 2015 which is a continuation of and claims priority benefit of U.S. Non-Provisional application Ser. No. 14/564,005 filed Dec. 8, 2014, which is a continuation of and claims priority benefit of U.S. Non-Provisional application Ser. No. 13/804,603 filed Mar. 14, 2013, which is a continuation application that claims priority benefit of U.S. application Ser. No. 13/127,584 which is a National Stage Application of PCT/US09/64003 filed Nov. 11, 2009, which claims priority benefit of Provisional U.S. Application No. 61/113,876 filed Nov. 12, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2016, Bally Gaming, Inc.

FIELD

Embodiments of the inventive subject matter relate generally to wagering game systems, and more particularly to wagering game systems that use images of optical machine-readable representations of data.

BACKGROUND

Most wagering game machines (WGMs) utilize a ticket based payout scheme instead of dispensing currency (e.g., coins, bills, etc.). At the end of a wagering session, a WGM dispenses a ticket displaying a player's winnings. The ticket is redeemed for cash at a cage in a casino.

In addition to ticket based payout schemes, many casinos operate player loyalty programs that utilize systems that track wagering behavior and collect demographic information of players. When a player joins a player loyalty program, the casino creates a personal information profile for the player and gives the player a casino club card.

BRIEF DESCRIPTION OF THE FIGURES

The present embodiments may be better understood, and numerous objects, features, and advantages made apparent to those skilled in the art by referencing the accompanying drawings.

DESCRIPTION OF THE EMBODIMENTS

The description that follows includes example systems, methods, techniques, instruction sequences and computer program products that embody techniques of the present inventive subject matter. However, it is understood that the described embodiments may be practiced without these specific details. For instance, although examples refer to mobile phones, embodiments may be implemented in any one of a variety of mobile devices (e.g., personal digital assistants (PDAs)). In other instances, well-known instruction instances, protocols, structures and techniques have not been shown in detail in order not to obfuscate the description.

A player who visits several different casinos may end up with several different club cards and multiple tickets. Carrying several different club cards and tickets can become cumbersome because they can be easily forgotten or lost. Additionally, a ticket can be destroyed if it gets wet (e.g., a drink is spilled on it) or crumpled. Club cards and tickets can be eliminated by providing an application that allows a player's mobile phone to process an image of an optical machine-readable representation of data. Examples of an optical machine-readable data representation images include an image of a linear barcode, an image of a matrix code ("2D barcode"), an image of text, etc. At the end of a wagering session on a WGM, the WGM can display a barcode representing a player's winnings, an achievement, game status, etc. The player takes a picture of the barcode with his or her mobile phone. The application on the phone processes the barcode and automatically updates an account of the player in accordance with the data represented or carried by the barcode. For instance, the mobile phone sends a request to a wagering account server to electronically deposit the winnings, as represented by the barcode, in a wagering account associated with the player's club profile. Completing payouts electronically may allow a casino to reduce the number of on-duty cashiers and the amount of cash reserved for daily payouts.

Figure 1:
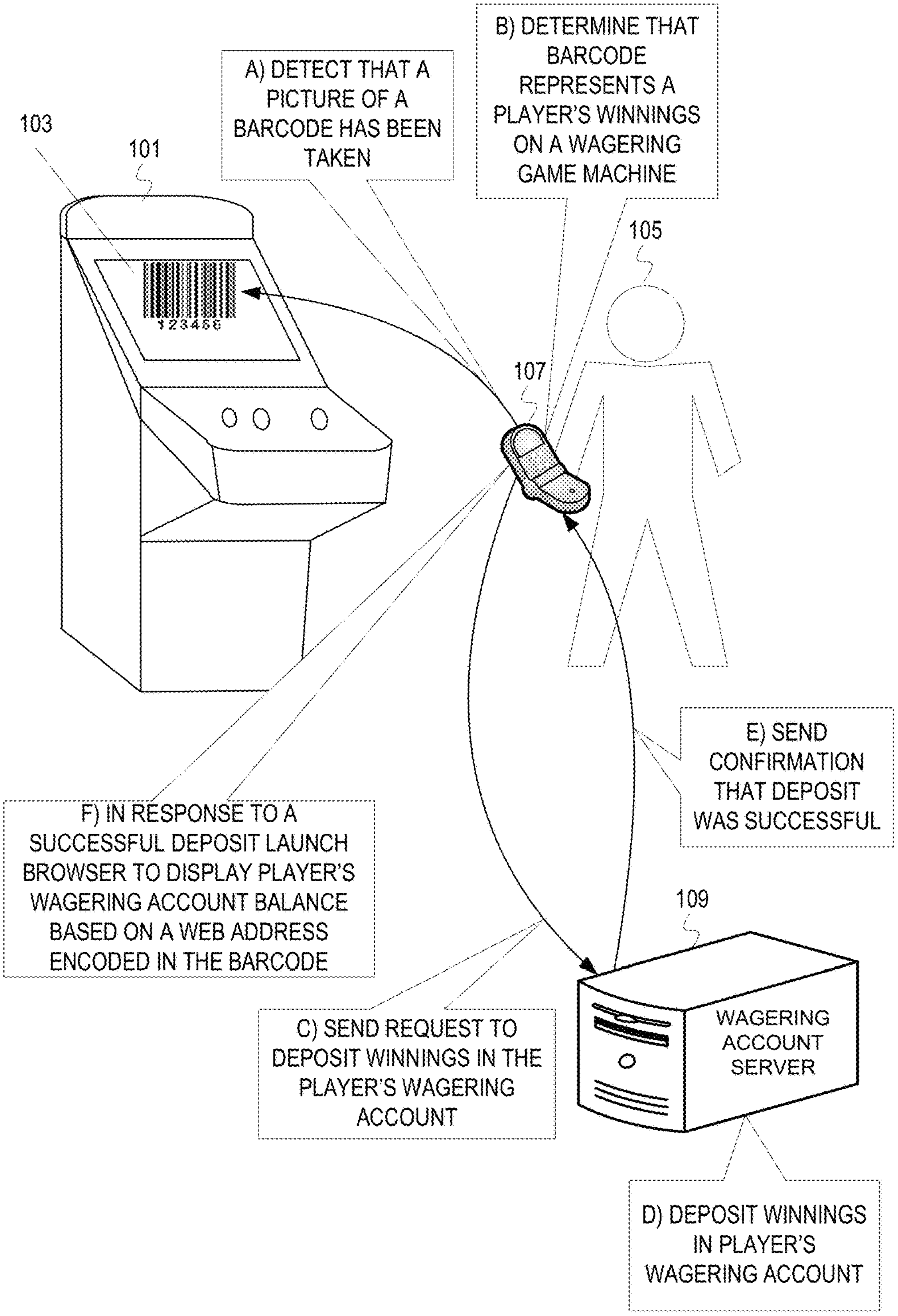
FIG. 1 is an example conceptual diagram of a mobile phone automatically sending a request to deposit winnings in a wagering account based on decoding an optical machine-readable data representation image, that is displayed by a WGM.

FIG. 1 is an example conceptual diagram of a mobile phone automatically sending a request to deposit winnings in a wagering account based on decoding an optical machine-readable data representation image, that is displayed by a WGM. A player 105 ends a wagering session on a WGM 101. The WGM 101 determines that an amount on a credit meter ("winnings") is greater than zero and displays the winnings encoded in an optical machine-readable data representation 103 on a screen of the WGM 101. For brevity, the examples depicted by the Figures will use the barcode example of an optical machine-readable data representation. Information, such as a wagering account number, a web address, a time stamp, a WGM identifier, etc. may also be encoded in the barcode 103. The player 105 uses his or her mobile phone 107 to acquire an image of the barcode 103 (e.g., takes a picture).

At stage A, a barcode recognition unit on the mobile phone 107 detects that a picture of a barcode has been taken. Example barcode recognition units include an application on the mobile phone, a plug-in for the camera software on the mobile phone, a chip, etc.

At stage B, the barcode recognition unit determines that the barcode represents player's 105 winnings on a wagering game machine. Determining that the barcode represents winnings comprises decoding the barcode into a string of alpha-numeric characters and recognizing a value (e.g., a prefix, an opcode, a preamble, etc.) in the string.

At stage C, the phone 107 sends a request to a wagering account server 109 to deposit the winnings in a wagering account of the player 105. The request comprises the amount of winnings and wagering account information (e.g., an account number). The request may be sent in an e-mail, a short message service (SMS) text message, etc. The wagering account information may be encoded in the barcode, encoded in a second barcode displayed by the WGM, provided by the mobile phone, etc. For example, the wagering account of player 105 is referenced using the phone number of mobile phone 107. The phone 107 sends an SMS text message to the wagering account server 109 to deposit winnings of $304.17 into the wagering account associated with the phone number 555-123-4567.

At stage D, the wagering account server 109 deposits the winnings in the wagering account of player 105. Before depositing the winnings in the wagering account, the wagering account server 109 determines that the wagering account information and winnings are valid. Determining that the winnings are valid may include contacting a wagering game server to verify a time stamp, the winnings amount and a WGM identifier supplied in the request, contacting the WGM to verify the time stamp and the winnings amount, etc.

At stage E, the wagering account server 109 sends a confirmation to the phone 107 that the deposit of the winnings was successful. The confirmation may be sent in an e-mail, short message service (SMS) text message, etc. At stage F, the mobile phone 107 launches a browser to display player's 105 wagering account balance. The browser automatically navigates to a web address encoded in the barcode 103. The web address may also be encoded in a second barcode (or different type of optical machine-readable data representation) displayed by the WGM 101. The second barcode may be displayed by the WGM at the same time as the barcode 103 or at a different time. Both barcodes may be captured in the same picture or in two separate pictures. In addition, the web address may be indicated in the confirmation message. In another embodiment, the web address may be sent in the confirmation message described at stage E.

Figure 2:
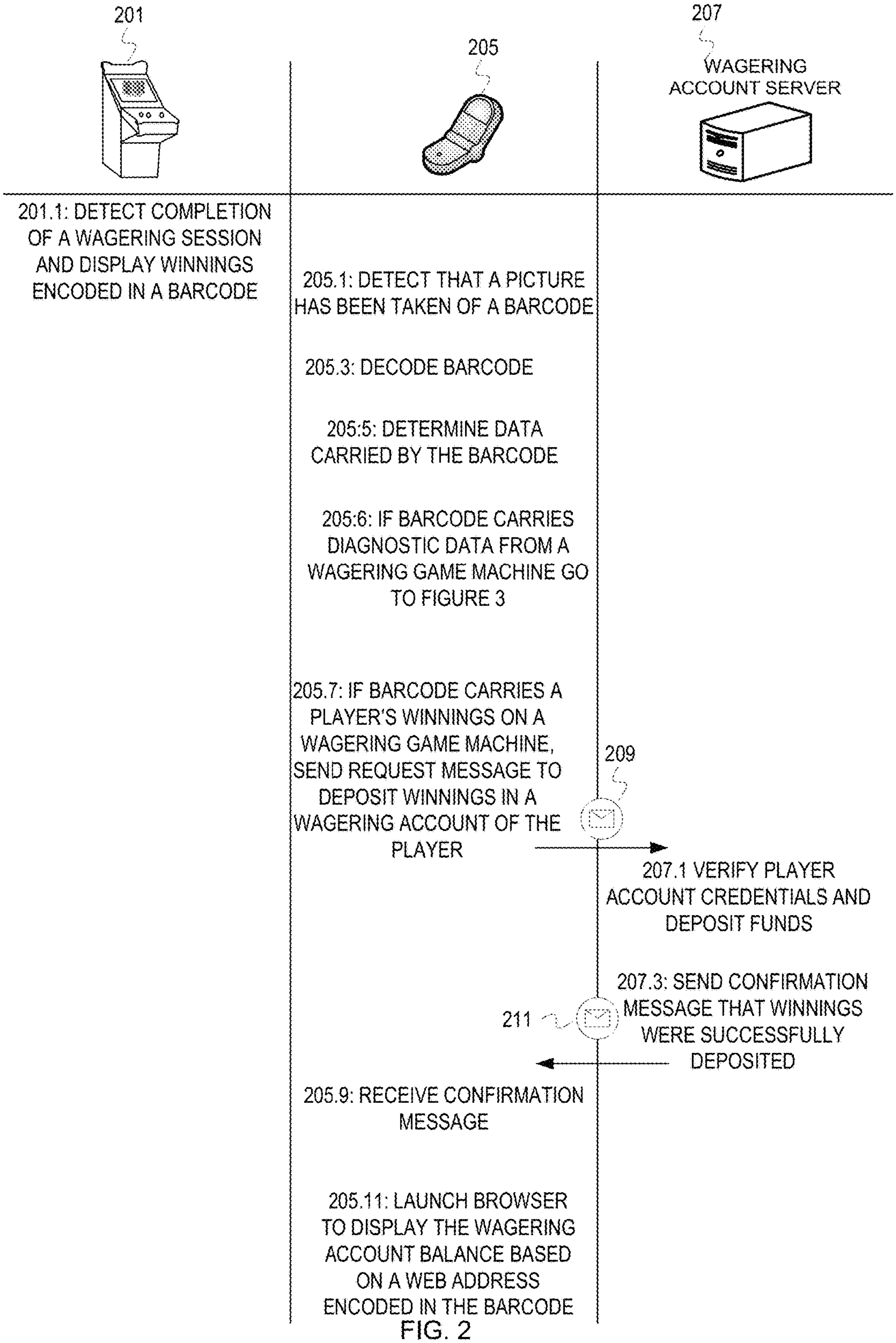
FIG. 2 is a diagram depicting example operations for a mobile phone automatically sending a request to deposit winnings in a wagering account based on decoding an image of an optical machine-readable data representation.

FIG. 2 is a diagram depicting example operations for a mobile phone automatically sending a request to deposit winnings in a wagering account based on processing an image of a barcode. At stage 201.1, a wagering game machine 201 detects completion of a wagering game session and displays winnings encoded in a barcode on a screen. A wagering game session is completed when a player requests a cash out, a player pushes an end button on a touch screen, etc. As an example, a winnings amount, a WGM identifier, a time stamp, a wagering account number and a web address are encoded in the barcode.

At 205.1, a mobile phone 205 detects that a picture of a barcode has been taken.

At 205.3, the mobile phone 205 decodes the barcode. The barcode may be decoded into binary data, into a string of alpha-numeric characters, into an XML string or any other format suitable for transferring the encoded data.

At 205.5, the mobile phone 205 determines the data carried by the barcode. Determining the data carried by the barcode comprises parsing the string into fields, (e.g., a prefix, a winnings amount, a wagering account number, etc.). For example, the carried data is determined based on a prefix. Examples of carried data include winnings, achievements, account information, diagnostic data, etc. Embodiments can provide the image of the optical machine-readable data representation to a server for the server to decode.

Figure 3:
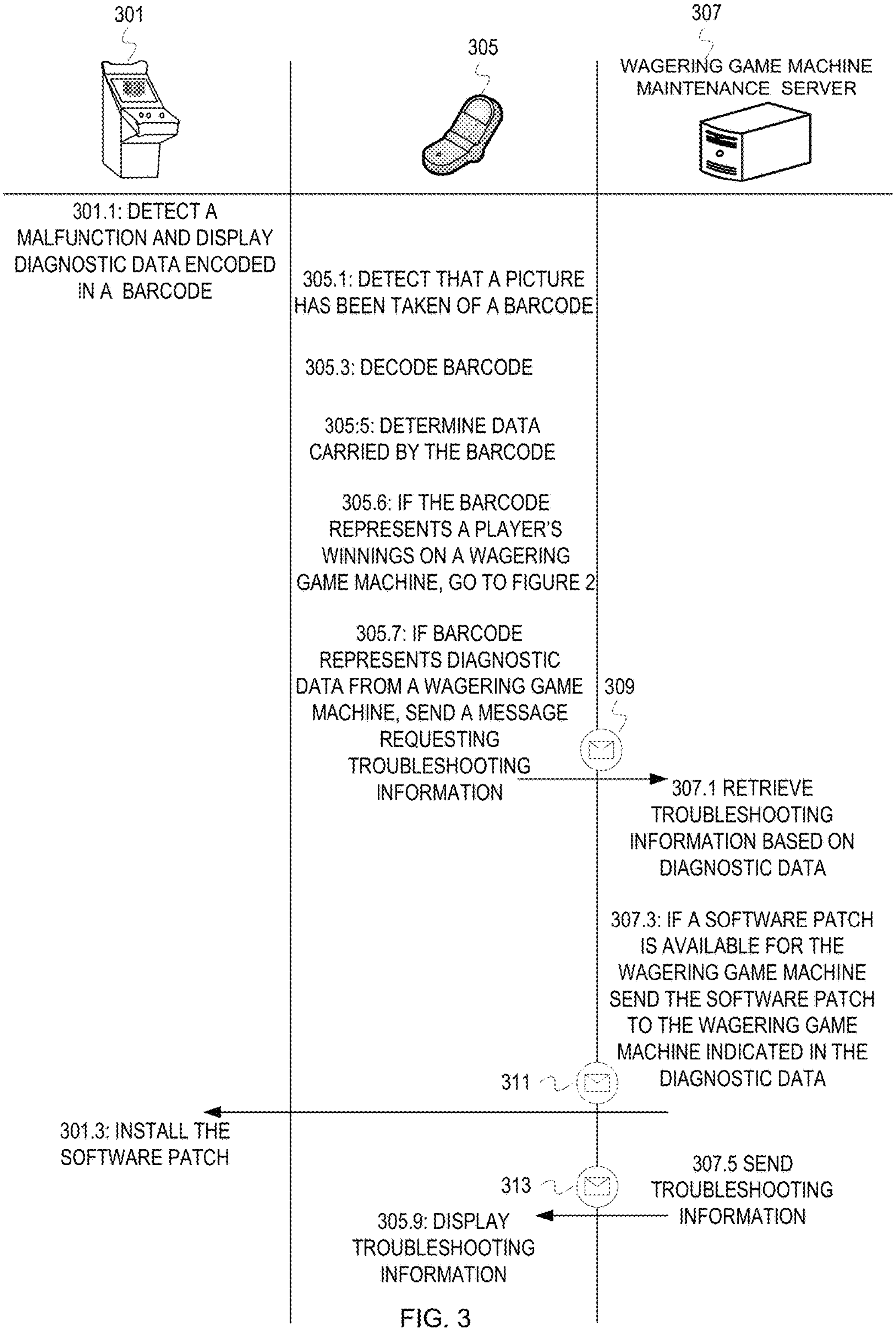
FIG. 3 is a conceptual diagram depicting example operations for a mobile phone automatically retrieving troubleshooting information based on processing an image of a barcode.

At 205.6, operations depicted in FIG. 3 are performed if the barcode carries diagnostic data from the wagering game machine 201.

If the barcode represents the player's winnings on the WGM 201, the mobile phone 205 sends a request message 209 to deposit winnings in a wagering account of a player to a wagering account server 207 at 205.7. For example, the mobile phone 205 sends an e-mail message to the wagering account server 207. The e-mail message includes a winnings amount, an account number, an account password, a WGM identifier and a time stamp. The account password may be stored in memory of the mobile phone 205 or the mobile phone 205 may prompt the user to enter the password. As another example, the mobile phone 205 can send a protocol message that conveys winnings amount, account information, etc.

At 207.1, the wagering account server 207 verifies account credentials of the player and deposits funds. In this example, the wagering account server determines that the password matches a stored password for the wagering account. The wagering account server 207 also verifies that the winnings are valid. For example, the wagering account server 207 contacts a wagering game server. The wagering account server 207 provides the WGM identifier, time stamp and winnings amount to the wagering game server. The wagering game server returns a code indicating if the winnings are valid.

At 207.3, the wagering account server 207 sends a confirmation message 211 that winnings were successfully deposited in the wagering account. For example, the wagering account server 207 sends an SMS text message to the mobile phone 205.

At 205.9, the mobile phone 205 receives the confirmation message 211.

At 205.11, the mobile phone 205 launches a browser to the wagering account balance based on an address encoded in the barcode captured at 205.1. Embodiments can also embed a barcode in the message sent from the wagering account server 207 to the phone 205.

Although examples refer to taking a picture of a barcode displayed on the screen of the WGM, embodiments are not so limited. For example, a WGM utilizing a ticket based payout scheme may print a ticket with winnings information encoded in a barcode. A picture can be taken of the barcode with a mobile phone to cause the mobile phone to interpret the barcode and automatically request that winnings be deposited in a wagering account of a player. A mobile phone or other personal mobile device may have a scanner to scan a ticket to read a barcode. As another example, the barcode may represent a reward (e.g., a coupon, a voucher, a digital trophy, etc.) offered to the player.

In addition to a WGM displaying winnings encoded in a barcode, the WGM may display diagnostic data encoded in a barcode when it detects a malfunction. A maintenance technician can take a picture of the barcode to cause his or her mobile device (e.g., phone, tablet, etc.) to automatically retrieve troubleshooting information from a wagering game maintenance server. Since troubleshooting information is automatically retrieved, the technician saves time by not performing a manual search.

FIG. 3 is a conceptual diagram depicting example operations for a mobile phone automatically retrieving troubleshooting information based on processing an image of a barcode. At stage 301.1, a WGM 301 detects a malfunction and displays a barcode that encodes diagnostic data. Diagnostic data may include an error code, status of the WGM when the malfunction occurred, a WGM identifier, a WGM network location, etc.

At 305.1, a mobile phone 305 detects that a picture has been taken of a barcode.

At 305.3, the mobile phone 305 decodes the barcode. The barcode is decoded into a string of alpha-numeric characters.

At 305.5, the mobile phone 305 determines the data carried by the barcode. Determining the carried data comprises parsing the string into fields, (e.g., an opcode, an error code, etc.). For example, the type of data can be determined based on an opcode.

At 305.6, operations from 205.7 in FIG. 2 are performed if the barcode represents a player's winnings on the wagering game machine 301.

If the barcode represents diagnostic data from the WGM 301, then the mobile phone 305 sends a message 309 to a wagering game maintenance server 307 at 305.7. The message indicates a request for troubleshooting information.

At 307.1, the wagering game machine maintenance server 307 retrieves troubleshooting information based on the diagnostic data in the message 309. The request message may be sent in an e-mail message, a short message service (SMS) text message, transaction message, protocol message, etc. Troubleshooting information comprises at least one of a repair manual, a write-up from a knowledgebase, etc.

At 307.3, the wagering game machine maintenance server 307 sends a software patch 311 and/or configuration data to the WGM 301 if available and appropriate. For example, the software patch is transmitted over an FTP (File Transfer Protocol) connection.

At 301.3, the WGM 301 installs the software patch 311.

At 307.5, the wagering game machine maintenance server 307 sends a message 313 containing troubleshooting information.

At 305.9, the mobile phone 305 displays the troubleshooting information in response to receiving the message 313. Displaying the troubleshooting information comprises at least one of launching a browser to navigate to a webpage, opening a text document, displaying a photo, etc.

Although the previous example referred to diagnostic data encoded in a barcode, embodiments are not so limited. For example, a WGM can display text based diagnostic information. A maintenance technician can take a picture of the text based diagnostic information with his or her mobile phone. The mobile phone can decode the text image using optical character recognition (OCR). The mobile phone can then request troubleshooting information from a maintenance server based on decoding the text image.

Although examples refer to a mobile phone taking a photo of a barcode presented by a WGM, embodiments are not so limited. For example, an individual may use his or her mobile phone to take a picture of a barcode included in advertising materials (e.g., a television commercial, a magazine advertisement, a poster, etc.) for a product. After decoding the barcode, the phone may launch a browser and navigate to a web address encoded in the barcode to a webpage with more information about a product, service, company, etc. As another example, an individual may take a picture of a barcode presented during a television show. After decoding the barcode, the phone may send a text message to a number encoded in the barcode to subscribe the individual to a newsfeed about the show, vote for an indicated contestant in a competition, participate in a game associated with the show, etc.

In the previous examples, a mobile phone embodied hardware and/or software that processed a captured image of a barcode and retrieved troubleshooting information or transferred funds. A WGM can also embody hardware/software with similar functionality. When a player joins a club at a casino, the player can take a picture of a barcode encoded with a profile identifier on his or her mobile phone. To begin a wagering session on a WGM, the player displays the picture on the screen of the mobile phone and holds it in front of a camera on the WGM. The camera on the WGM takes a picture of the barcode and decodes it. The WGM accesses the player's club profile and links a wagering account associated with the profile to the wagering session.

Although examples refer to a mobile phone decoding a barcode, embodiments are not so limited. For example, the mobile phone determines that a picture has been taken of a barcode. The mobile phone may transmit the barcode to a wagering account server. In response, the wagering account server decodes the barcode in the picture and determines that winnings should be deposited in an account encoded in the barcode. As another example, the phone determines that a picture has been taken of a barcode. The phone decodes the barcode into a string of characters and transmits the string to the wagering account server.

Figure 4:
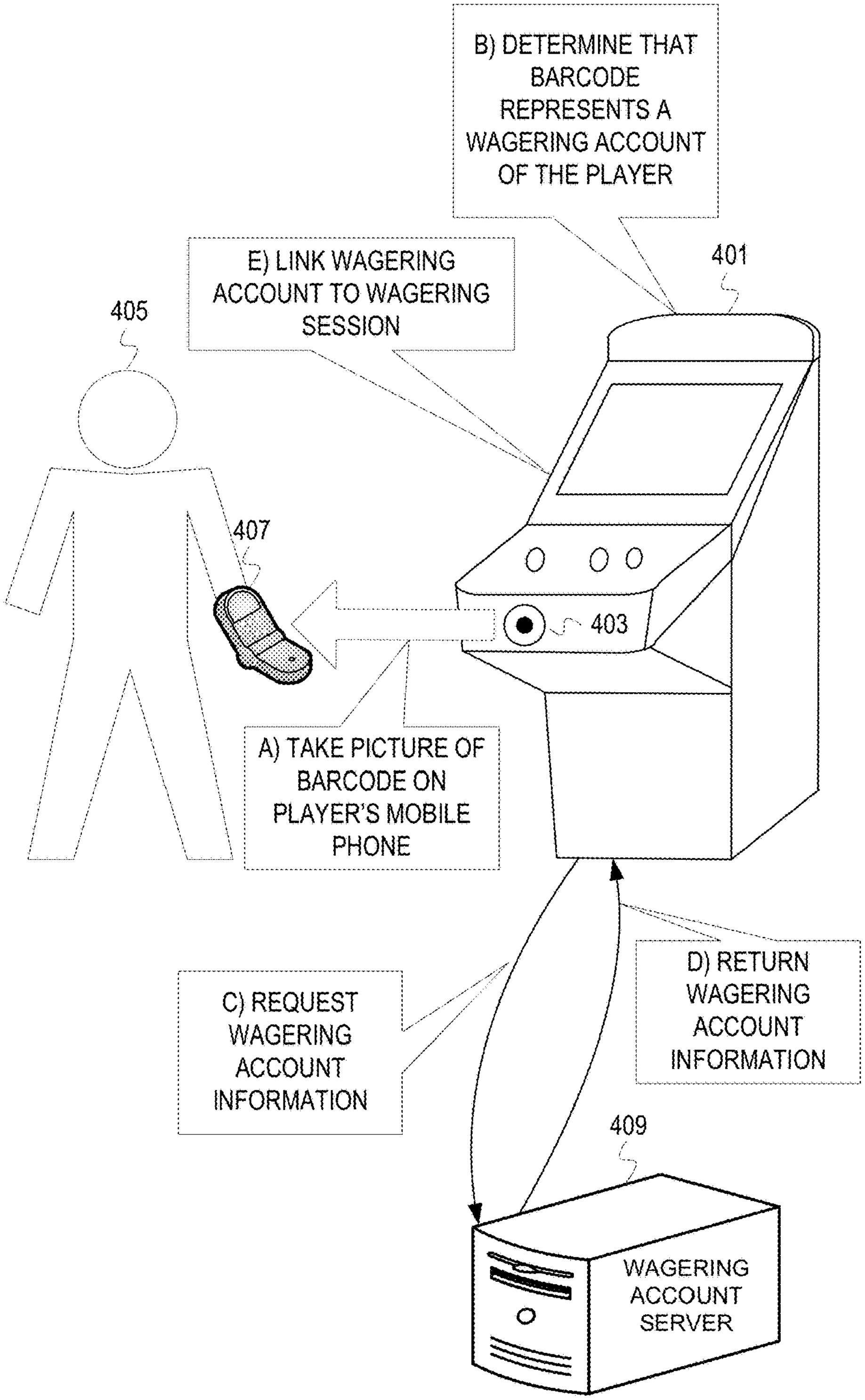
FIG. 4 is an example conceptual diagram of a WGM automatically linking a wagering account of a player to a wagering session based on decoding an image of a barcode.

FIG. 4 is an example conceptual diagram of a WGM automatically linking a wagering account of a player to a wagering session based on decoding an image of a barcode. A player 405 displays a picture of a barcode on the screen of mobile phone 407. At stage A, a WGM 401 takes a picture of the barcode on the mobile phone 407 with a digital camera 403. The digital camera 403 is capable of capturing still images and may also be capable of capturing video. In this example, the digital camera 403 is directly integrated into the housing of the WGM 401. However, the digital camera 403 could also be a stand-alone device (e.g., a webcam) connected to the wagering game machine 401.

At stage B, a barcode recognition unit on the WGM 401 determines that the barcode represents a wagering account of the player 405. Determining that the barcode represents winnings comprises decoding the barcode into a string of alpha-numeric characters and recognizing a value (e.g., a prefix, an opcode, a preamble, etc.) in the string.

At stage C, the WGM 401 requests wagering account information from a wagering account server 409. Wagering account information comprises at least one of a balance, an account holder's name, a password, etc.

At stage D, the wagering account server 409 returns wagering account information to the WGM 401.

At stage E, the WGM 401 links the wagering account to the wagering session. Linking the wagering account to the wagering session comprises verifying that the player 405 owns or is permitted access/use of the wagering account, and loading a balance of the wagering account to allow the player 405 to place wagers from the balance. The player indicates a portion of the balance to use for wagering. In some examples, the portion of the balance may be transferred (i.e., debited) from the account to a temporary account on the WGM. In other examples, a temporary hold may be placed on the portion of the balance while the wagering session is active. In addition, the barcode displayed on the mobile phone may be encoded with a particular amount for wagering.

In addition to wagering accounts, an optical machine-readable data representation can represent a player loyalty account (or an account can be a wagering account and a player loyalty account). If a player belongs to several casino loyalty programs, managing and accessing the different casino loyalty program accounts may be inefficient and/or inconvenient. The several casino loyalty program accounts can be associated with an online account of the player (e.g., an online profile, a digital wallet, etc.). A wagering game machine and the mobile device of a player can be configured to automatically associate the several casino loyalty program accounts with the online account.

Figure 12:
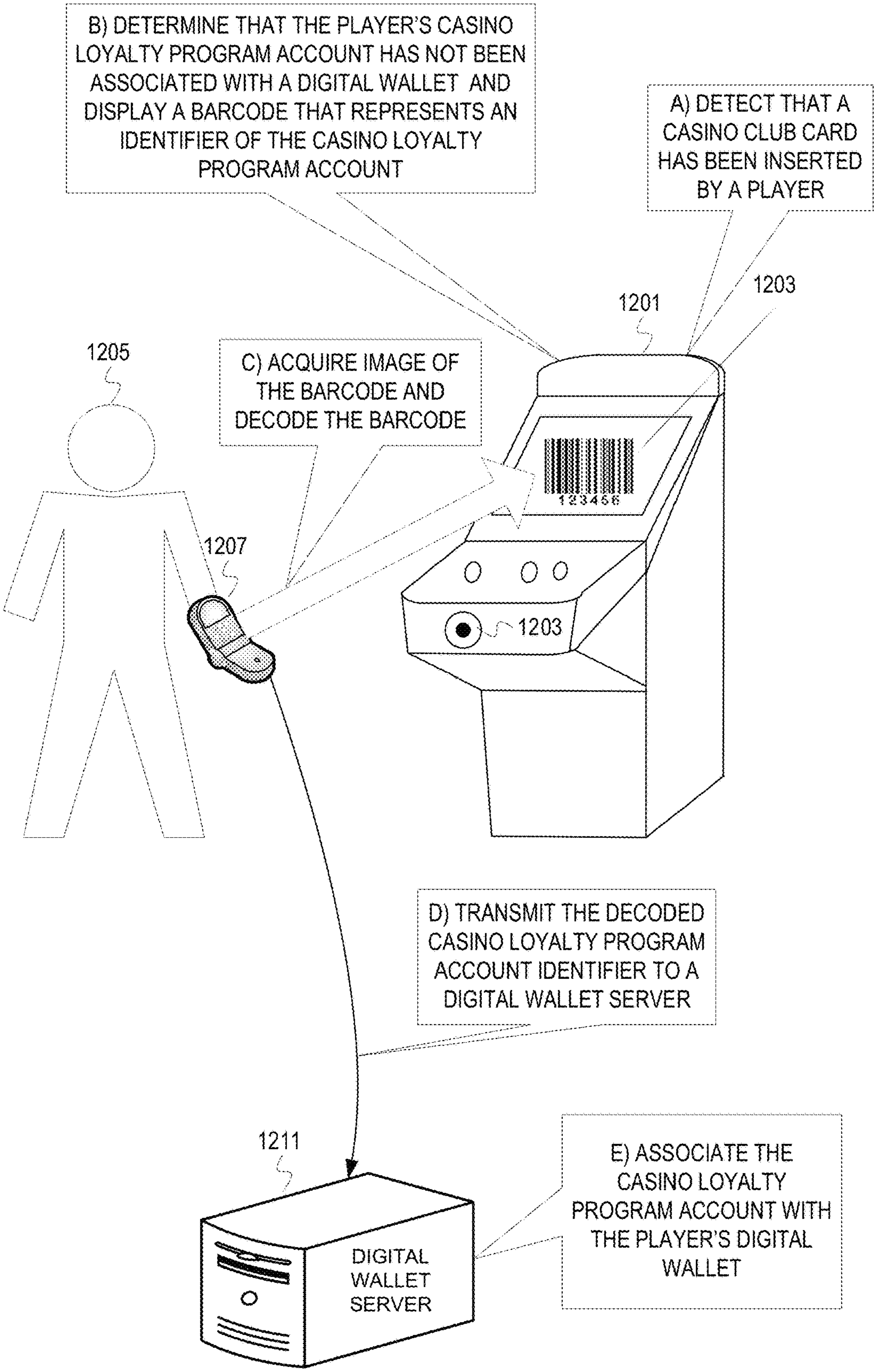
FIG. 12 is an example conceptual diagram of automatically associating a casino loyalty program account with a digital wallet.

FIG. 12 is an example conceptual diagram of automatically associating a casino loyalty program account with a digital wallet. At stage A, a WGM 1201 detects that a casino club card has been inserted by a player 1205.

At stage B, the WGM 1201 determines that the player's casino loyalty program account has not been associated with a digital wallet and displays an identifier of the casino loyalty program account encoded in a barcode 1203. Determining that the player's casino loyalty program account can comprise the WGM 1201 communicating with a server to access the player's casino loyalty program account. The server determines that an online account identifier (e.g., digital wallet) is not indicated in the casino loyalty program account. The server provides the WMG 1201 a notification that the casino loyalty program account is not associated with a digital wallet.

At stage C, the player acquires an image of the barcode 1203 (e.g., takes a pictures) using a mobile phone 1207. The mobile phone 1207 processes the acquired image, and decodes the barcode 1203 to determine the casino loyalty program account identifier.

At stage D, the mobile phone 1207 transmits the casino loyalty program account identifier to a digital wallet server 1211 along with data that identifies the digital wallet of the player 1205. For instance, the mobile phone 1207 transmits a message that indicates a sender with a phone number associated with the mobile phone 1207. The digital wallet server 1211 determines the digital wallet based on the phone number. In another example, the mobile phone 1207 transmits a combination of biometric data, the phone number, and an image, which collectively identifies the digital wallet of the player 1205.

At stage E, the digital wallet server 1211 associates the casino loyalty program account with the digital wallet of the player 1205. For instance, the digital wallet server 1211 creates an entry for the casino loyalty program account and stores the casino loyalty program account identifier. The optical machine-readable data representation can also indicate information that allows the digital wallet server 1211 to communicate with the server that handles the casino loyalty program account (e.g., casino loyalty program account password, network address of the casino loyalty program server, etc.). The digital wallet server 1211 can then notify the casino loyalty program server that the digital wallet of the player 1205 has been associated with the casino loyalty program account of the player 1205.

Although FIG. 12 depicts associating a casino loyalty program account with a digital wallet, embodiments are not so limited. Embodiments can associate a wagering game establishment account (e.g., casino loyalty program account, wagering account, etc.) with one or more of an e-mail account, online portal account (e.g., a Yahoo! ® online account, an Apple® online account, etc.), etc. The association can also be leveraged to provide additional services/conveniences to a player. For instance, the player can get an aggregated view of all of the player's casino loyalty program accounts across multiple wagering game establishments in a single portal. As another example, the association can be leveraged to facilitate exchanges between different loyalty programs and/or migrations of points/rewards among loyalty programs. A player can also wager with funds from a credit card or online banking account associated with an online account of the player.

FIG. 12 also indicates swiping of a player card. After optical machine-readable data representation images are stored on a personal mobile device, the personal mobile device can be used to access a player account (e.g., wagering account, loyalty program account, etc.). For example, a casino loyalty program account identifier can be associated with an icon on the mobile phone 1207. To access the casino loyalty program account, the player 1205 can select the appropriate icon for the mobile phone 1207 to display the image of the barcode 1203. The WGM 1201 can then scan the barcode 1203 provided by the mobile phone 1207 and automatically access the casino loyalty program account of the player 1205. As another example, the mobile phone 1207 can present all barcodes that encode player account identifiers. The WMG 1201 can scan all of the barcodes and automatically access the account represented by the one of the barcodes recognized by the WGM 1201 (or backend server).

In addition to a WGM automatically accessing player accounts (e.g., loyalty program accounts, wagering accounts, hospitality accounts, etc.) based on decoding a barcode in a picture, a WGM can launch a specific game or resume a multi-stage game based on information encoded in the barcode.

Figure 5:
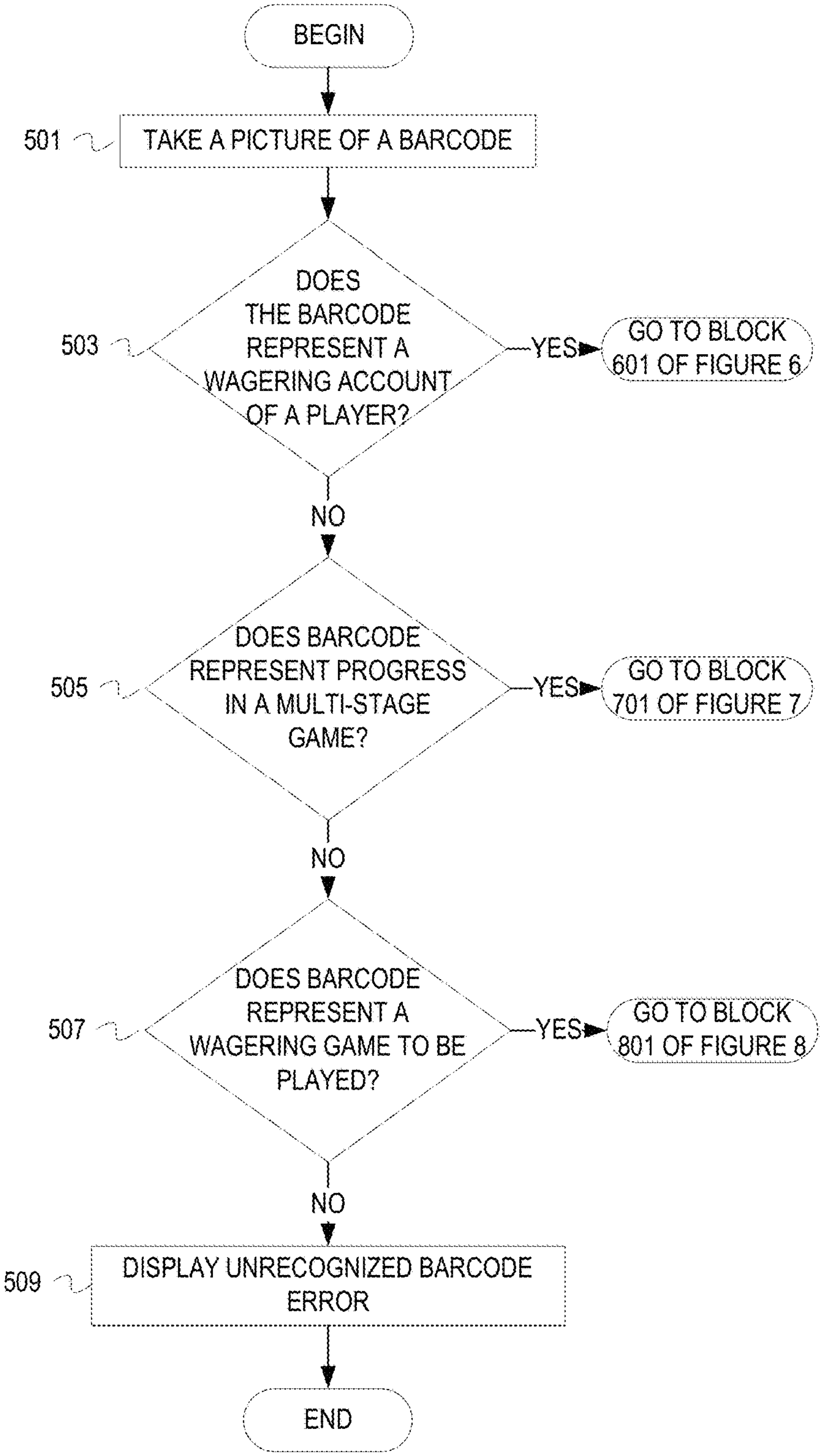
FIG. 5 is a flowchart depicting example operations for determining a barcode type.

FIG. 5 is a flowchart depicting example operations for determining the type of data represented in a barcode. At block 501, a WGM takes a picture of a barcode. A WGM can automatically take a picture of a barcode in response to detecting that a barcode has been placed in front of a digital camera connected to the WGM or in response to an action by a player (e.g., a player pushes a capture button, etc.).

At block 503, it is determined if the barcode represents a wagering account of a player. If the barcode represents the wagering account of the player, then flow continues at block 601 of FIG. 6. If the barcode does not represent the wagering account of the player, then flow continues at block 505.

At block 505, it is determined if the barcode represents progress in a multi-stage game. If the barcode represents progress in a multi-stage game, flow continues at block 701 of FIG. 7. If the barcode does not represent progress in a multi-stage game, flow continues at block 507.

At block 507, it is determined if the barcode represents a wagering game to be played. If the barcode indicates a wagering game to be played, flow continues at block 801 of FIG. 8. If the barcode does not indicate a wagering game to be played, flow continues at block 509.

At block 509, the WGM displays an unrecognized barcode error.

It should be realized that embodiments are not limited to the types of data in the example depicted in FIG. 5. Optical machine-readable data representations can represent a variety of data. Additional operations can be performed to determine the type of data represented before or instead of generating an error notification. For example, an optical machine-readable data representation can encode a data type indicator and the data. A process can then access a library of data types using the data type indicator to determine how to process the data.

Figure 6:
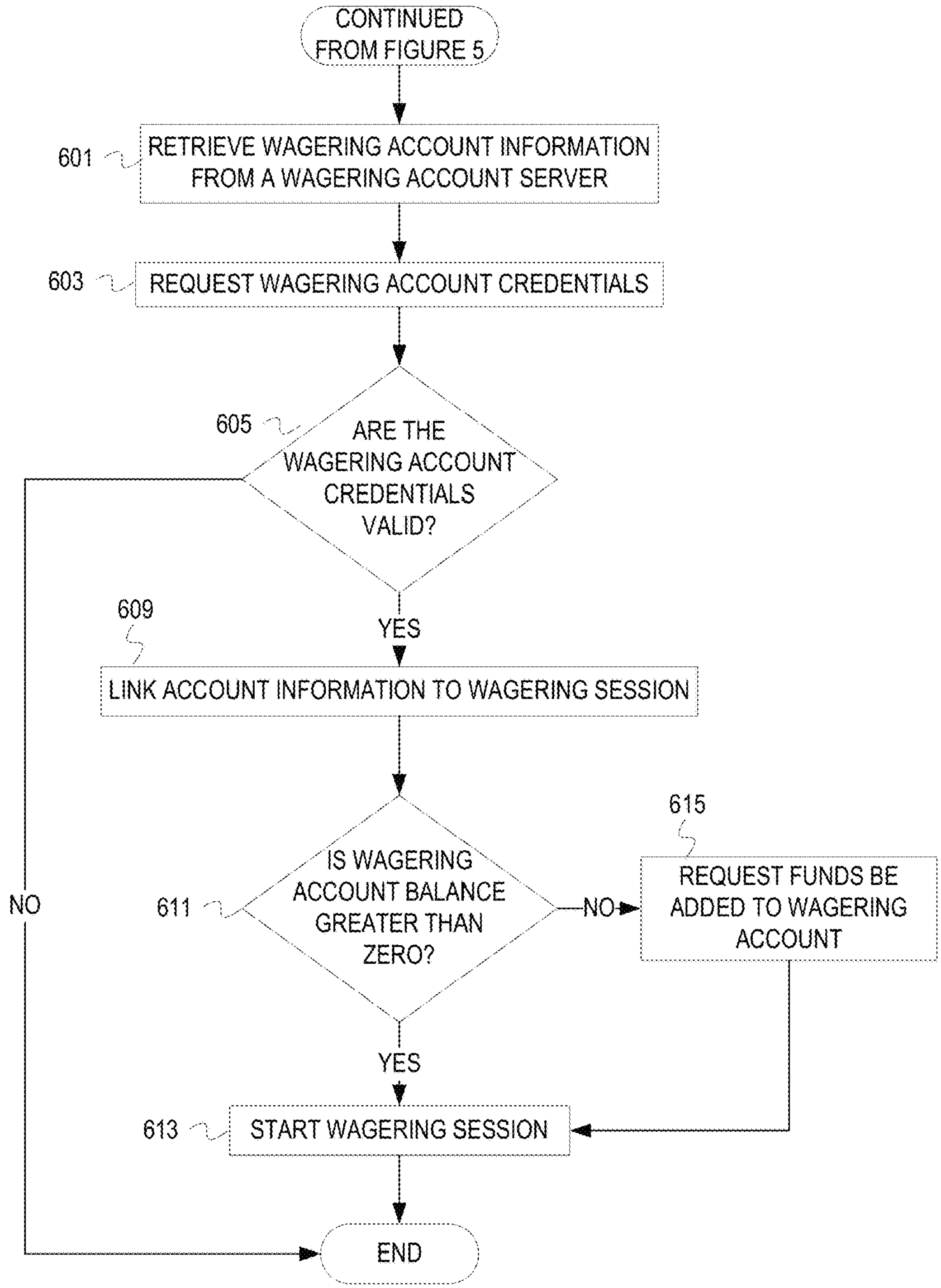
FIG. 6 is a flow chart depicting example operations for a WGM linking a wagering account to a wagering session based on decoding an image of a barcode.

FIG. 6 is a flow chart depicting example operations for a WGM linking a wagering account to a wagering session based on decoding an image of a barcode. Flow begins at block 601, where wagering account information is retrieved from a wagering account server.

At block 603, wagering account credentials are requested from a player. In response to the request, the player inputs wagering account credentials. Examples of wagering account credentials comprise a username and password, a fingerprint, etc. Embodiments can also embed credentials in the barcode to allow obviation of prompting a player. Embodiments can also allow credentials to be stored in a personal mobile device, separate from the bar code, and transmitted to a wagering game machine from the personal mobile device.

At block 605, it is determined if the wagering account credentials are valid. The credentials input by the player are compared to the credentials retrieved from the wagering account server. If the wagering account credentials are valid, flow continues at block 609. If the wagering account credentials are invalid, flow ends. Embodiments can also prompt a player to retry, or generate a notification that the credentials are invalid.

At block 609, account information is linked to the wagering game session. For example, a persistent wagering game session is established. As another example, a balance of the wagering account is shown as credits on the WGM allowing the player to place wagers. Linking a wagering game session with account information can also involve creating data structures on a backend to indicate access by a wagering game to an account.

At block 611, it is determined if a wagering account balance is greater than zero. If the wagering account balance is greater than zero, flow continues at block 613. If the wagering account balance is not greater than zero, flow continues at block 615.

At block 613, the wagering session starts.

At block 615, funds are requested to be added to the wagering account and flow continues at block 613. Embodiments can also condition flow of operations from block 615 to block 613 on any one of confirming that funds have been added, funds being deposited into the wagering game machine, etc.

In addition to allowing the player to place wagers on the WGM with the wagering account balance, the WGM can automatically deposit any leftover credits ("winnings") into the wagering account. Although examples refer to linking a wagering account to a wagering session, embodiments are not so limited. For example, a rewards account associated with a player's club profile may be linked to the wagering session.

Some WGMs, such as the Star Trek® slot machine, feature multi-stage games that allow players to play multiple levels displaying different graphics or bonus opportunities. A WGM can display a barcode representing a player's progress in a multi-stage game to allow the player to return to the same level of game play at a later time. The player takes a picture of the barcode with a personal mobile device and presents the picture to the WGM when the player wants to resume the game.

Figure 7:
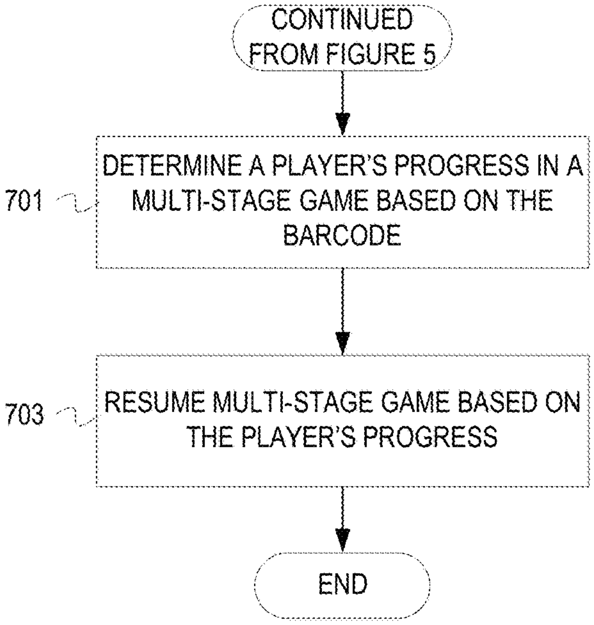
FIG. 7 is a flowchart depicting example operations for continuing a multi-stage game in response to a WGM decoding an image of a barcode.

FIG. 7 is a flowchart depicting example operations for continuing a multi-stage game in response to a WGM decoding an image of barcode. Flow begins at block 701 from block 505 FIG. 5, where a player's progress in a multi-stage game are determined based on the barcode. For example, a number sequence representing a level in the multi-stage game is encoded in the barcode.

At block 703, the multi-stage game is resumed based on the player's progress.

In addition to game progress and wagering game account data, a barcode can carry data indicating a particular wagering game or wagering game developer. Casinos often distribute marketing materials for WGM wagering games over a variety of different media (e.g., print, television, Internet, etc.). If a barcode is included in the marketing materials, a player can take a picture of the barcode with a mobile phone. When the player comes to the casino, the player can present the picture on the mobile phone to a WGM. The WGM takes a picture of the barcode on the mobile phone's screen and automatically pulls up the wagering game for the player. This is extremely useful when multiple wagering games are available for play on the WGM because the player does not have to memorize the title of the wagering game or browse a menu to find it.

Figure 8:
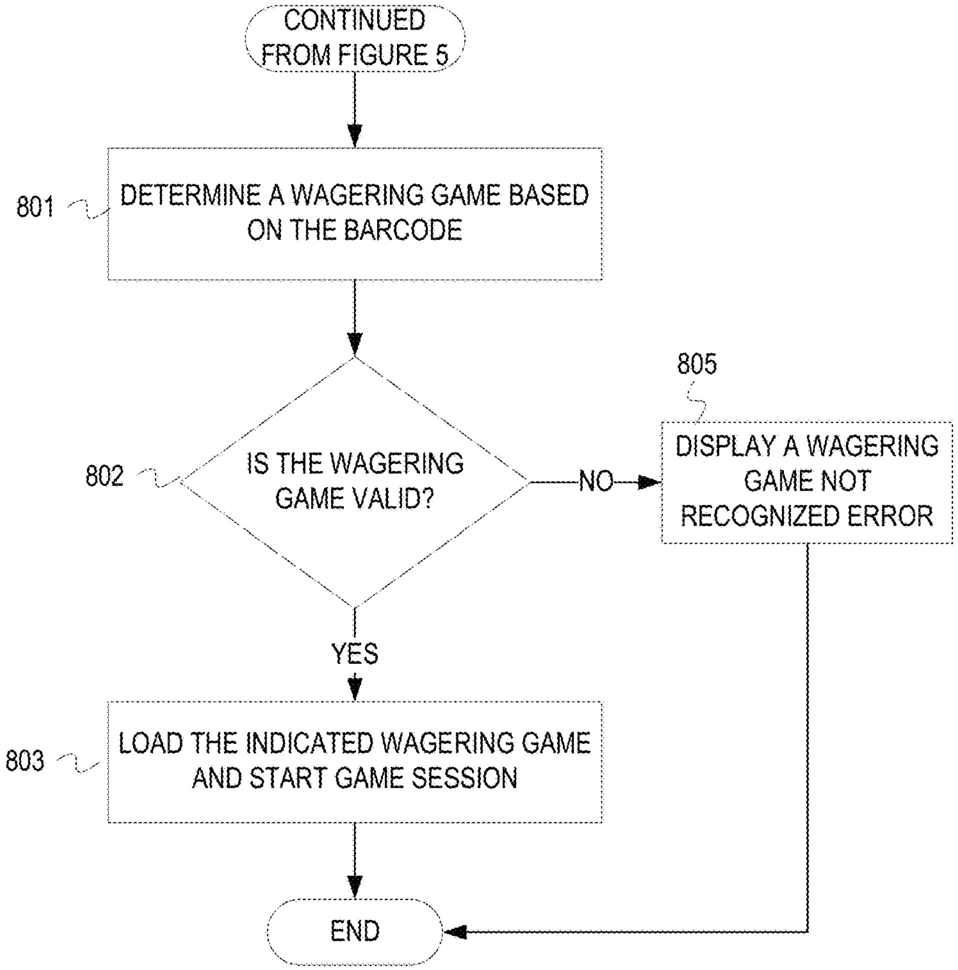
FIG. 8 is a flowchart depicting example operations for a WGM loading an indicated game based on decoding an image of a barcode in a picture.

FIG. 8 is a flowchart depicting example operations for a WGM loading an indicated game based on decoding an image of a barcode. Flow begins at block 801 from block 507 of FIG. 5, where a wagering game is determined based on the barcode. For example, the title and/or a game identifying number of the game may be encoded in the barcode. The WGM searches for the indicated title in a menu system.

At block 802, it is determined if the wagering game is valid (i.e., the wagering game is installed on the WGM). If the wagering game is valid, flow continues at block 803. If the wagering game is not valid, flow continues at block 805.

At block 803, the indicated wagering game is loaded and game session is started.

At block 805, a wagering game not found error is displayed. Embodiments can also recommend alternatives when an indicated wagering game is not valid.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, referring to FIGS. 2 and 3, the operations for determining data carried by the barcode may occur in parallel. Referring to FIG. 5, the operations for determining a type of data represented by the barcode can be performed in any order. Referring to FIG. 6, the operations for retrieving wagering account information and requesting wagering account credentials may occur in parallel.

Operating Environment

This section describes an example operating environment and presents structural aspects of some embodiments. This section includes discussion about wagering game machine architectures and wagering game networks.

Wagering Game Machine Architectures

Figure 9:
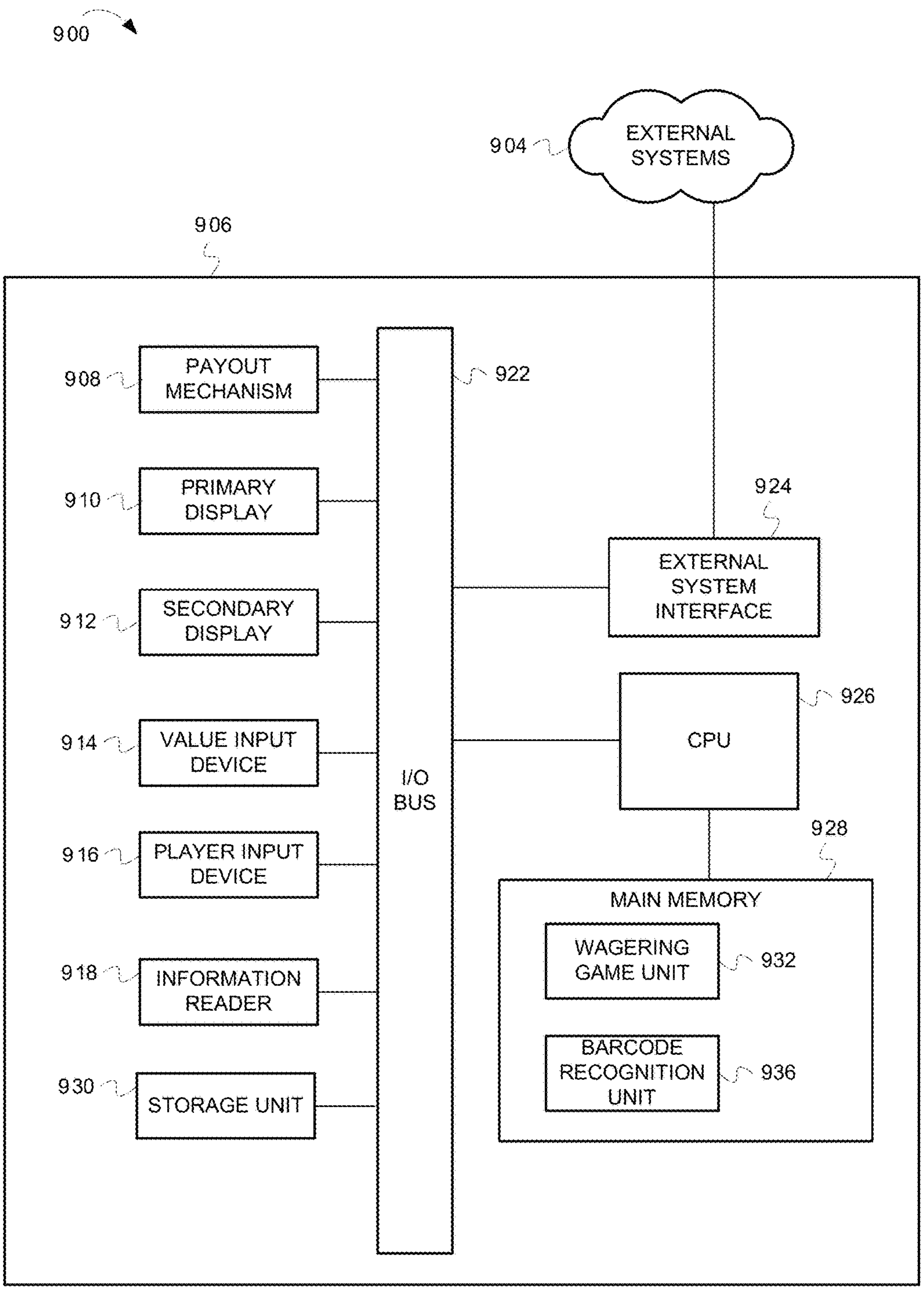
FIG. 9 is a block diagram illustrating a wagering game machine architecture, according to example embodiments of the invention.

FIG. 9 is a block diagram illustrating a wagering game machine architecture, according to example embodiments of the invention. As shown in FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In one embodiment, the wagering game unit 932 can present wagering games, such as video poker, video blackjack, video slots, video lottery, etc., in whole or part. The main memory also includes a barcode recognition unit 936 that interprets pictures of barcodes to link account information to a wagering game session, load an indicated wagering game or resume game play in a multi-stage game.

The CPU 926 is also connected to an input/output (I/O) bus 922, which can include any suitable bus technologies, such as an AGTL+frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks, a digital camera, etc.).

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

Any component of the architecture 900 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 9 describes an example wagering game machine architecture, this section continues with a discussion of wagering game networks.

Wagering Game Networks

Figure 10:
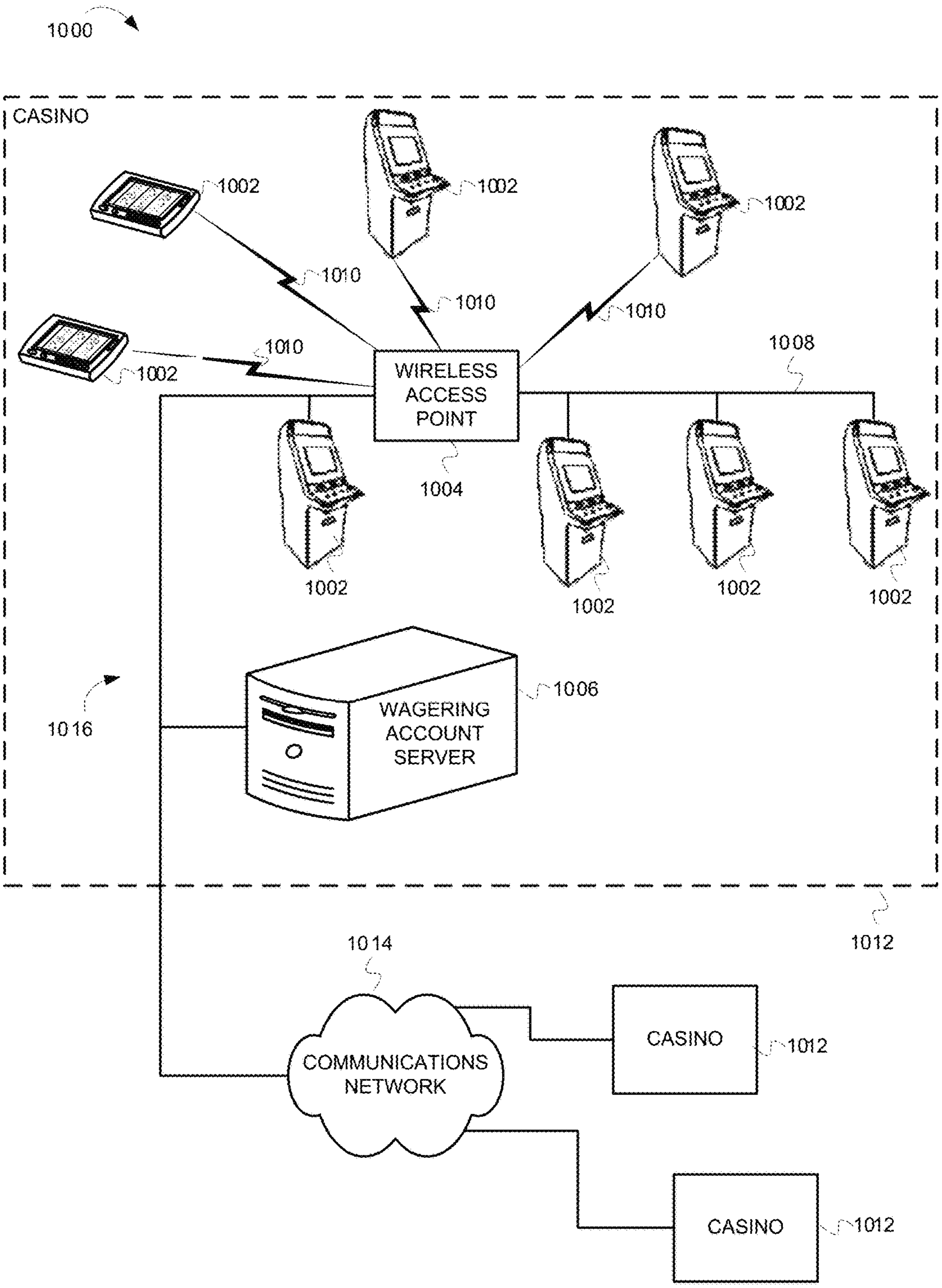
FIG. 10 is a block diagram illustrating a wagering game network 1000, according to example embodiments of the invention.

FIG. 10 is a block diagram illustrating a wagering game network 1000, according to example embodiments of the invention. As shown in FIG. 10, the wagering game network 1000 includes a plurality of casinos 1012 connected to a communications network 1014.

Each casino 1012 includes a local area network 1016, which includes an access point 1004, a wagering game server 1006, and wagering game machines 1002. The access point 1004 provides wireless communication links 1010 and wired communication links 1008. The wired and wireless communication links can employ any suitable connection technology, such as Bluetooth, 802.11, Ethernet, public switched telephone networks, SONET, etc. In some embodiments, the wagering game server 1006 can serve wagering games and distribute content to devices located in other casinos 1012 or at other locations on the communications network 1014.

The wagering game machines 1002 described herein can take any suitable form, such as floor standing models, handheld mobile units, bartop models, workstation-type console models, etc. Further, the wagering game machines 1002 can be primarily dedicated for use in conducting wagering games, or can include non-dedicated devices, such as mobile phones, personal digital assistants, personal computers, etc. In one embodiment, the wagering game network 1000 can include other network devices, such as accounting servers, wide area progressive servers, player tracking servers, and/or other devices suitable for use in connection with embodiments of the invention.

In some embodiments, wagering game machines 1002 and wagering game servers 1006 work together such that a wagering game machine 1002 can be operated as a thin, thick, or intermediate client. For example, one or more elements of game play may be controlled by the wagering game machine 1002 (client) or the wagering game server 1006 (server). Game play elements can include executable game code, lookup tables, configuration files, game outcome, audio or visual representations of the game, game assets or the like. In a thin-client example, the wagering game server 1006 can perform functions such as determining game outcome or managing assets, while the wagering game machine 1002 can present a graphical representation of such outcome or asset modification to the user (e.g., player). In a thick-client example, the wagering game machines 1002 can determine game outcomes and communicate the outcomes to the wagering game server 1006 for recording or managing a player's account.

In some embodiments, either the wagering game machines 1002 (client) or the wagering game server 1006 can provide functionality that is not directly related to game play. For example, wagering account transactions and account rules may be managed centrally (e.g., by the wagering game server 1006) or locally (e.g., by the wagering game machine 1002). Other functionality not directly related to game play may include power management, presentation of advertising, software or firmware updates, system quality or security checks, etc. The wagering game server 1006 can also use data carried in a barcode to deposit funds into wagering accounts, send troubleshooting information based on diagnostic data carried by barcodes, and transmit wagering account information to wagering game machines 1002.

Any of the wagering game network components (e.g., the wagering game machines 1002) can include hardware and machine-readable media including instructions for performing the operations described herein.

Example Wagering Game Machines

Figure 11:
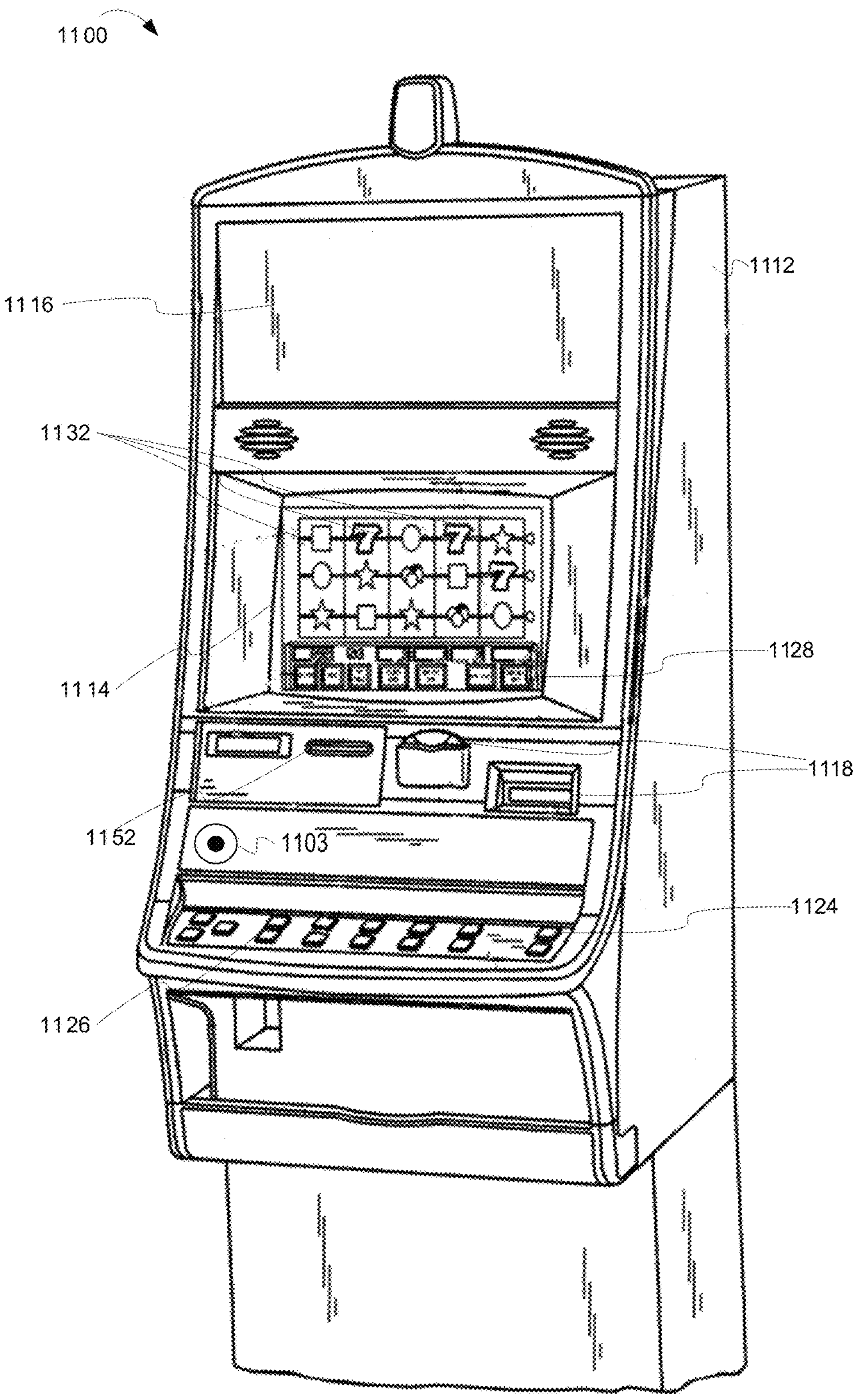
FIG. 11 is a perspective view of a wagering game machine, according to example embodiments of the invention.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a payline 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

The wagering game machine 1100 also includes a digital camera 1103 that allows the wagering game machine to capture barcode images. The digital camera 1103 may be capable of capturing both still images and video. In some embodiments, the digital camera 1103 is a stand-alone device (e.g., a webcam) connected to the wagering game machine 1100 by any suitable wired or wireless communication technology. In other embodiments, the digital camera 1103 is directly integrated into the housing 1112 of the wagering game machine 1100.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

establishing a credit balance at a stationary, freestanding gaming machine primarily dedicated for use in conducting wagering games, the credit balance funding wagers to play a first wagering game at the gaming machine independent of a mobile device;

receiving, via an electronic input device of the gaming machine, a cashout input that initiates a cashout of funds from the credit balance to a player account on a wagering account server;

receiving, via an electronic input device of the mobile device, a user input to access the funds from the player account; and in response to the user input, issuing, by the mobile device to the wagering account server, a request indicating at least a portion of the funds from the player account for funding wagers to play a second wagering game at the mobile device independent of the gaming machine.

2. The method of claim 1, further comprising:

receiving, by the mobile device, an image of a code provided by the gaming machine, wherein the code represents data indicating the funds from the credit balance;

decoding the code; and depositing the funds from the credit balance into the player account.

3. The method of claim 2, wherein the code or a second code provided by the gaming machine further represents data including one or more of an account number for the player account, a web address for accessing the player account, a timestamp, and an identifier of the gaming machine.

4. The method of claim 2, wherein the code or a second code provided by the gaming machine further represents data including account credentials for the player account, and comprising utilizing the credentials to access the funds from the player account to play the second wagering game at the mobile device.

5. The method of claim 2, wherein the code or a second code provided by the gaming machine further represents data including an identifier for the second wagering game, and comprising loading the second wagering game on the mobile device based, at least in part, on the identifier.

6. The method of claim 2, wherein the code comprises a linear barcode, a matrix code, or text.

7. The method of claim 2, wherein receiving the code comprises capturing, by the mobile device, the image of the code displayed on an electronic display of the gaming machine or on a ticket provided by the gaming machine.

8. A method comprising:

establishing a credit balance at a stationary, freestanding gaming machine primarily dedicated for use in conducting wagering games, the credit balance funding wagers to play a first wagering game at the gaming machine independent of a mobile device; and receiving, via an electronic input device of the gaming machine, an input that initiates a cashout of funds from the credit balance to a player account on a wagering game server, the funds in the player account being accessible from the mobile device to fund wagers to play a second wagering game at the mobile device independent of the gaming machine.

9. The method of claim 8, further comprising:

providing, by the gaming machine, a code, wherein the code represents data including one or more of the funds from the credit balance, an account number for the player account, a web address for accessing the player account, a timestamp, and an identifier of the gaming machine.

10. The method of claim 9, wherein the code or a second code provided by the gaming machine further represents data including account credentials for the player account, wherein the mobile device is configured to utilize the credentials to access the funds from the player account to play the second wagering game at the mobile device.

11. The method of claim 9, wherein the code or a second code provided by the gaming machine further represents data including an identifier for the second wagering game, wherein the mobile device is configured to utilize the identifier to load the second wagering game.

12. The method of claim 9, wherein the code comprises a linear barcode, a matrix code, or text.

13. The method of claim 9, wherein providing the code comprises displaying an image of the code on an electronic display of the gaming machine or printing the code on a ticket.

14. A system comprising:

one or more controllers; and one or more non-transitory memory devices storing instructions that, when executed by the one or more controllers, cause the system to control a gaming system, the instructions comprising:

instructions to establish a credit balance at a stationary, freestanding gaming machine primarily dedicated for use in conducting wagering games, the credit balance funding wagers to play a first wagering game at the gaming machine independent of a mobile device;

instructions to receive, via an electronic input device of the gaming machine, an input that initiates a cashout of funds from the credit balance to a player account on a wagering game account server;

instructions to receive, via an electronic input device of the mobile device, a user input to access the funds from the player account;

instructions to, in response to the user input, issue, by the mobile device to the wagering account server, a request indicating at least a portion of the funds from the player account for funding wagers to play a second wagering game at the mobile device independent of the gaming machine.

15. The system of claim 14, wherein the gaming machine is configured to provide a code, and wherein the mobile device is configured to:

receive an image of the code, wherein the code represents data including the funds from the credit balance;

decode the code; and deposit the funds from the credit balance into the player account.

16. The system of claim 15, wherein the code or a second code provided by the gaming machine further represents data including one or more of an account number for the player account, a web address for accessing the player account, a timestamp, and an identifier of the gaming machine.

17. The system of claim 15, wherein the code or a second code provided by the gaming machine further represents data including account credentials for the player account, and wherein the mobile device is configured to utilize the credentials to access the funds from the player account.

18. The system of claim 15, wherein the code or a second code provided by the gaming machine further represents data including an identifier for the second wagering game, and wherein the mobile device is configured to utilize the identifier to load the second wagering game on the mobile device.

19. The system of claim 15, wherein the code comprises a linear barcode, a matrix code, or text.

20. The system of claim 15, wherein the mobile device is further configured to capture the image of the code provided on an electronic display of the gaming machine or on a ticket provided by the gaming machine.

* * * * *